2,786,964

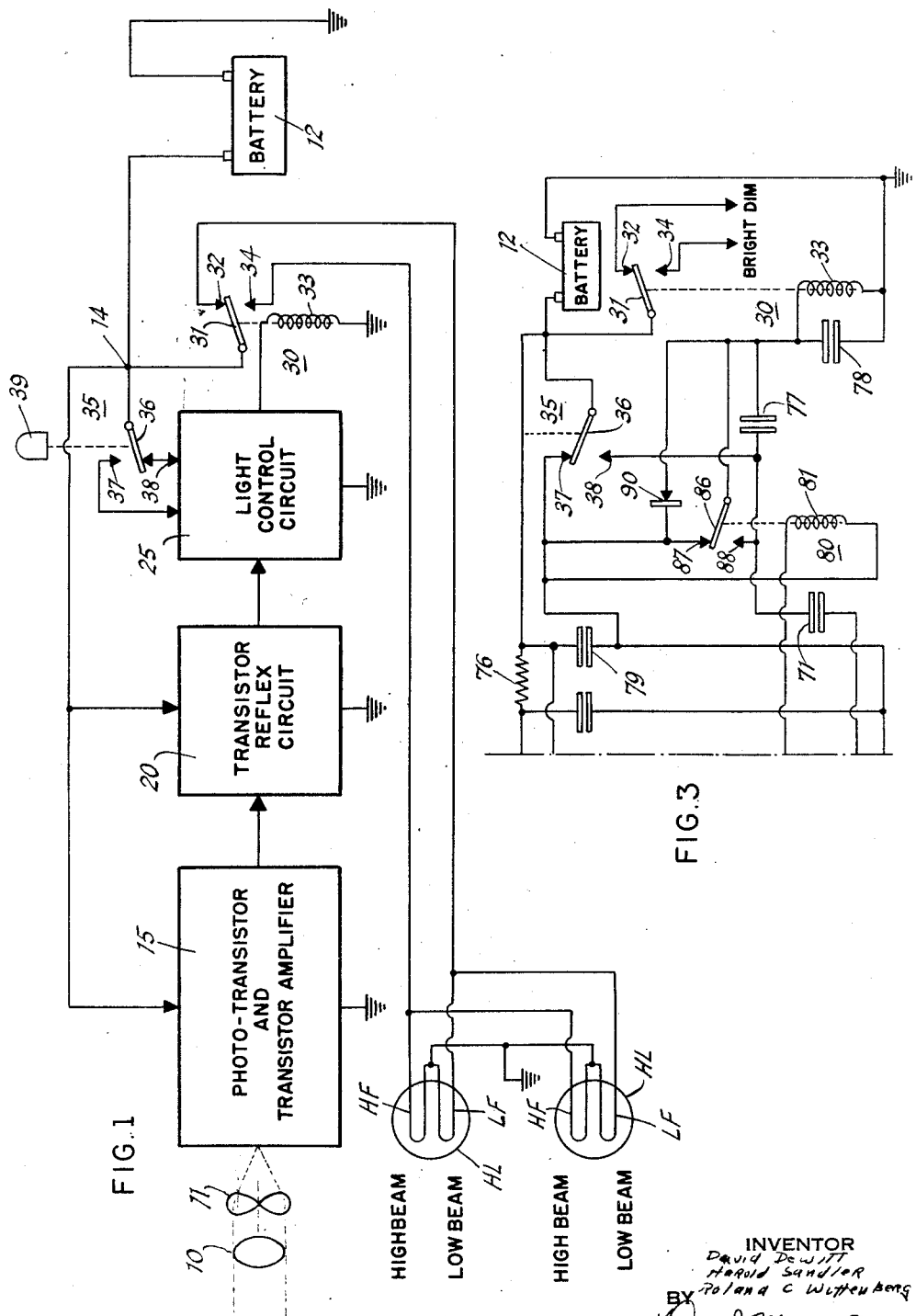

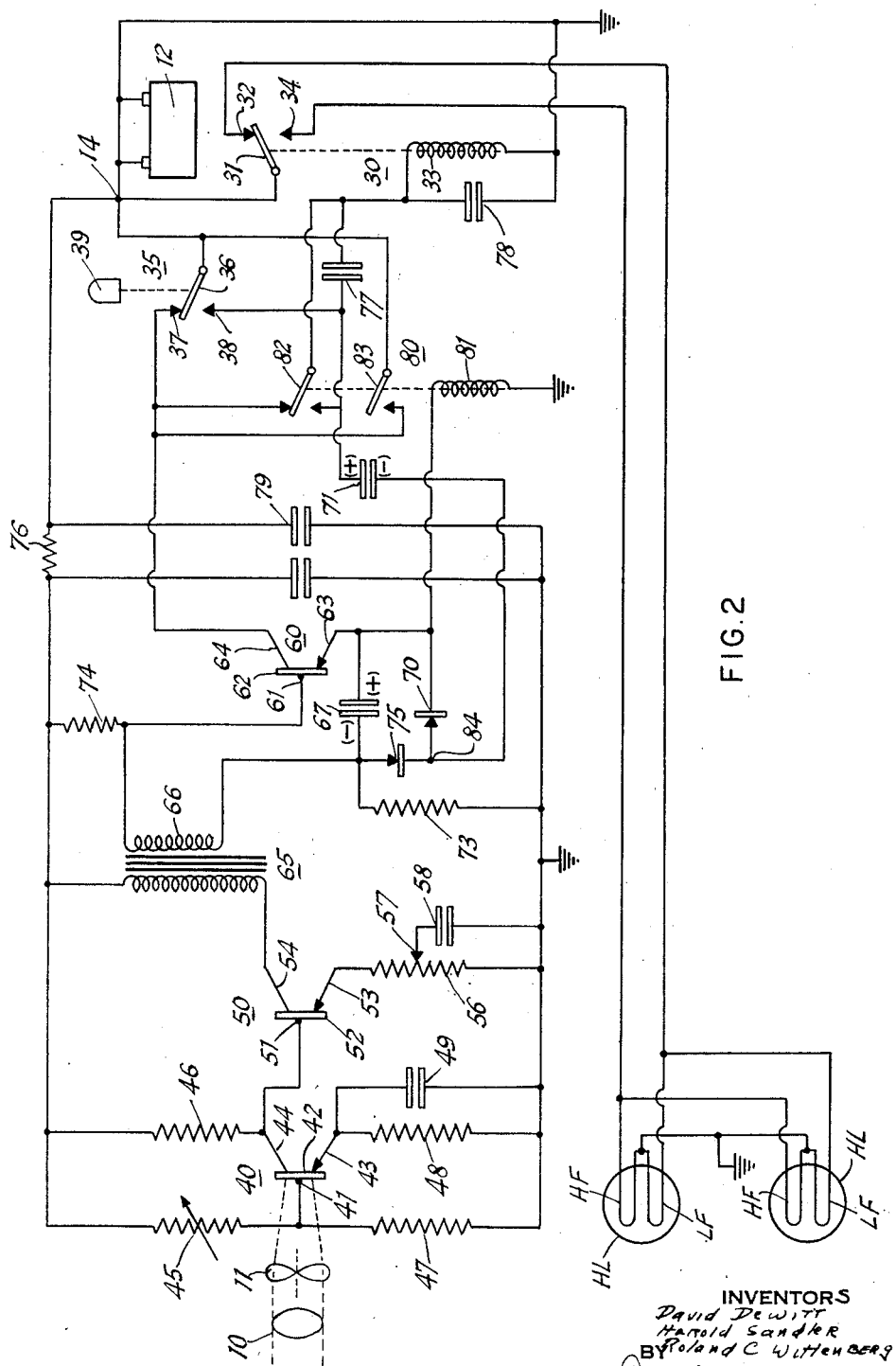

HEADLIGHT DIMMER SYSTEM

David De Witt, Northport, Harold Sandler, Whitestone, and Roland C. Wittenberg, New Hyde Park, N. Y., assignors to Radio Receptor Company, Inc., Brooklyn, N. Y., a corporation of New York Application May 12, 1954, Serial No. 429,322

9 Claims. (Cl. 315—83)

This invention relates to systems for automatically dimming automotive vehicle headlamps responsive to the approach of a passing vehicle. More particularly, the invention is directed to a compact and simplified system of this type, utilizing transistors, and which can be operated either automatically, or manually with the standard mode of foot switch control of the headlamps.

Automotive vehicle headlamps are customarily provided with two filaments which may be called, respectively, the "high beam" filament and the "low beam" filament. These two filaments are so disposed, relative to the headlamp reflector surface, that the "low beam" light is directed somewhat downwardly so as to illuminate the route for only a relatively short distance in advance of the vehicle, while the "high beam" light is directed more nearly horizontally and illuminates the route for a substantial distance in advance of the vehicle. Frequently, the "high beam" filament has a candlepower rating substantially in excess of that of the "low beam" filament.

The "low beam" or "dim" light is used on lighted routes, when driving at lower speeds, and when passing an approaching vehicle, as its direction angle is such as not to affect substantially the vision of the driver of an approaching vehicle.

The "high beam" or "bright" light is used for driving on unlighted routes and for high speed driving. It has the disadvantage that its angle is such as to at least partially blind the driver of an oncoming vehicle. Consequently, safe drivers dim their headlamps, when sighting an approaching vehicle, by switching from the "high beam" to the "low beam."

Such selection of the "dim" or "bright" light is usually effected by operating a foot switch. On successive operations, this switch alternately energizes the "bright" and "dim" filaments. However, operation of this foot switch requires some attention from the driver, thereby creating a hazard when two vehicles are approaching each other at high speeds. Also, after the vehicles have passed each other, the headlamps should be switched back to "bright" to compensate for the suddenly decreased illumination of the route as the vehicles pass each other. The necessary attention to this switching also creates a hazard in high speed driving.

To eliminate these hazards, it has been proposed to dim the headlamps automatically in response to the light from an approaching vehicle, and systems have been designed to accomplish this automatic dimming. In general, such systems switch the headlamps from "bright" to "dim" when the light intensity on a sensing device at the front of the vehicle exceeds a pre-set value, and switch the headlamps back to "bright" when the light intensity on the sensing device is less than a predetermined value.

Such systems desirably should be so designed that the headlamps operate in the usual manner when the foot switch is operated, and also are automatically dimmed (if on "bright") when a vehicle approaches. Furthermore, the system should control the headlamps in such manner that the operator can manually "lock" the headlamps in the "dim" position, but cannot manually "lock" the headlamps in the "bright" position. In other words, the lights should always be dimmed by the system whenever another vehicle approaches.

Of the several automatic control systems so far proposed, some do not allow manual operation, by the foot switch, in the usual manner, and therefore the driver (used to the usual control by the foot switch) must be "re-educated" to properly use the automatic control system. Others of these systems allow the driver to manually lock the headlamps on "bright," over-riding the automatic control. Thus, the usefulness of the control is destroyed.

While some of the proposed systems have met the aforementioned criteria as to "normal" manual control without "locking" on the "high" beam, they have been so complex, bulky, and generally unreliable as to mitigate against their acceptance as a practical device. These latter systems have generally involved a complicated arrangement of electronic tubes, relays, and involved circuit connections. Servicing is difficult, and installation in a vehicle is complicated and expensive. Additionally, finding a sufficiently large available space to mount the relatively bulky control system is very difficult.

The present invention is directed to an automatic control system which is simple, compact, easily installed and serviced, rugged, and meets all the aforementioned desired criteria. The invention system includes a light detector involving a photo-transistor associated with a lens and light chopper, and a transistor amplifier. The detector output signal is amplified in a novel reflex circuit including transistor amplifiers and rectifiers. The amplified signal is applied to a light control circuit including a sensitive relay which acts conjointly with a foot operated switch to control a "slave" relay which switches the headlamp connections.

By utilizing transistors as detectors, amplifiers, and rectifiers, all electronic tubes are eliminated and the bulk and weight, as well as the power requirements, are reduced to a fraction of the values required with previous systems. Also, the life of the transistors is substantially greater than the limited life of electronic tubes.

The use of a novel transistor reflex amplifier circuit as a second stage eliminates at least one stage of amplification, as the reflex circuit, in effect, doubles the amplification of the input signal by first amplifying the A. C. input signal and then re-amplifying the fed-back amplified and rectified signal.

The provision of a "slave" relay for switching of the headlamps under the joint control of the sensing relay and a foot switch enables the lights to be manually controlled in the normal manner and selectively locked on "dim," while preventing manual locking of the lights on "bright."

For an understanding of the invention principles, reference is made to the following description of a typical embodiment thereof as illustrated in the accompanying drawings.

In the drawings:

Fig. 1 is a schematic block diagram of the invention headlamps control system;

Fig. 2 is a schematic wiring diagram of one embodiment of the system; and

Fig. 3 is a schematic wiring diagram, corresponding to a part of Fig. 2, illustrating another embodiment of the invention.

Referring to Fig. 1, a lens 10 is mounted on the front of the vehicle and arranged to direct light from an approaching vehicle upon a photo-transistor mounted in light receiving relation to lens 10. A light chopper 11 is associated with lens 10 to periodically and repeatedly interrupt the light directed onto the photo-transistor. The construction and operation of transistors have been adequately described in the patent art and in technical literature.

Transistors may be rendered active or conductive if exposed to light whose photons have a sufficiently high energy value. These photons disturb the valence bonds of the transistor by ejecting an electron from a bond creating a free electron and a hole permitting a current flow. Thus, the transistor becomes a photo-transistor which is responsive to illumination, transforming a light impulse into an electrical signal.

In the present invention, the light is directed by lens 10 upon a photo-transistor of such type, which is temperature stabilized by a resistance network. The resulting A. C. output of the photo-transistor, due to light chopper 11, is amplified by a transistor-amplifier triode in unit 15, and the amplified A. C. signal is applied to the input of reflex circuit 20.

Reflex circuit 20 amplifies and rectifies the A. C. input signal and then amplifies the rectified D. C. signal. This amplified D. C. signal is applied to control circuit 25 and is sufficient in value to operate a sensitive relay in the control circuit. This sensitive relay controls the operation of a slave relay 30 which is also conjointly under the control of a foot operated switch 35 operating through control circuit 25.

The system is energized from the usual grounded vehicle battery 12, which is connected to relay 30, switch 35 and control circuit 25. Switch 35 operates in the normal manner to alternately engage arm 36 with contacts 37 and 38 upon successive depressions of button or head 39. For reference purposes hereinafter, contact 37 will be termed the "automatic" contact and contact 38 the "manual" contact.

Relay 30 controls the selective energization of the "high" and "low" beam filaments of headlamps HL. Each headlamp includes a high beam filament HF and a low beam filament LF. All the filaments are commonly grounded at 13. Armature 31 of relay 30 is connected to battery 12 at junction 14, and engages contact 32 when relay coil 33 is de-energized. Contact 32 is connected to low beam filaments LF. When relay coil 33 is energized, armature 31 engages contact 34 connected to high beam filaments HF.

The operation of the system will be understood from a description of Fig. 2. The light is directed by lens 10 through a light chopper 11, thence onto a photo-transistor 40. This transistor includes a block 42 of N-type semiconductor material having a base electrode 41 connected to it. One small portion of block 42 is made P-type semi-conductor and contacted by an emitter electrode 43 and a collector electrode 44 contacts the P-type semi-conductor on the opposite surface of block 42. A potential is applied across transistor 40 from battery 12 through a resistance-condenser network including a variable resistance 45 connected to base electrode 41, a fixed resistor 46 connected to collector electrode 44, a fixed resistor 47 connected to base electrode 41, and a parallel resistor-condenser arrangement 48—49 connected to emitter electrode 43. Temperature compensation or stabilization is effected by the network including resistors 45, 47 and 48.

The light falling on transistor 40 through lens 10 and chopper 11 is converted by transistor 40 into an A. C. potential appearing across resistor 46. This resistor, and collector electrode 44, are directly coupled to the base electrode 51 of a transistor amplifier triode 50 including a semi-conductor block 52, an emitter electrode 53 and a collector electrode 54. Transistor 50 has a gain control in its emitter circuit, this control comprising potentiometer 56 whose adjustable contact 57 is in series with a condenser 58. Transistor 50 has a power gain of approximately 30 db. Adjustment of contact 57 controls the amount of degeneration by varying the value of the by-passed emitter resistance.

Transistor 50 is temperature stabilized by virtue of the direct coupling of its base electrode 51 to the collector electrode 44 of photo-transistor 40, and also by the potentiometer 56. As the temperature increases, the increased current through transistor 40 causes collector electrode 44 to become less negative, thus causing the collector current of transistor 50 to decrease.

The amplified A. C. collector current from transistor 50 is applied as an A. C. input signal to the transistor reflex circuit 20 through a matching coupling transformer 65. As stated, reflex circuit 20 amplifies and rectifies the A. C. input signal and further amplifies the amplified and rectified signal.

In the particular transistor reflex circuit illustrated, the secondary winding 66 of transformer 65 is directly connected to the base electrode 61 of a triode transistor 60 including a semi-conductor block 62, an emitter electrode 63, and a collector electrode 64. Circuit 20 operates as a grounded emitter, base input connection for A. C. amplification by virtue of condenser 67 coupling emitter electrode 63 to transformer winding 66.

The A. C. input signal is fed to the base electrode 61 and is amplified in the grounded emitter electrode connection. The amplified A. C. signal flows through the coil 81, of sensitive relay 80, to ground. Collector electrode 64 is connected to battery 12 by foot switch 35 when armature 36 is engaged with contact 37, the "automatic" contact. When armature 36 is engaged with "manual" contact 38, collector electrode 64 is disconnected from the battery and reflex circuit 20 is inoperative.

To understand the operation of circuit 20, assume the instantaneous A. C. potential across coil 81 is going negative. This will cause a diode 70 to conduct and charge condenser 71 to the polarity shown. When the A. C. potential across relay coil 81 is going positive, a diode 75 conducts and diode 70 is non-conductive. Capacitor 67 now charges to the polarity shown through diode 75, capacitor 71, and relay coil 81. Capacitor 71 also discharges into capacitor 67, providing a voltage doubling action.

The discharging current from capacitor 67 through base electrode 61 constitutes a base current which is amplified by the current gain of transistor 60 connected as a grounded collector stage. This amplified D. C. output flows through relay coil 81, emitter electrode 63, collector electrode 64, battery 12, and the ground to relay coil 81, thus energizing sensitive relay 80 whenever an output signal is received by reflex circuit 20 from photo-transistor 40. Temperature compensation is provided by resistors 73, 74, and the D. C. resistance of relay 80.

It is desirable that the headlamps HL be held on "dim" at a lesser value of light input to photo-transistor 20 than the value required to initiate the dimming action. The reason for this is as follows. The headlamps HL are dimmed responsive to headlight from an approaching vehicle. At the same time, the headlamps of the approaching vehicle are dimmed. Consequently, less light is available at lens 10 to keep headlamps HL dim. Therefore, the sensitivity of the control circuit to light input must be increased after the control circuit switches headlamps HL to "dim." This is effected to some extent by relay 80 having the characteristic of holding with less current than is required to close the relay. However, as a safety measure, additional sensitivity "hold down" is provided.

Referring to Fig. 2, without any light input to photo-transistor 20, contacts 82 and 83 of relay 80 are open. The effective capacity from junction point 84 to ground is the series combination of capacitors 71, 77 and 78. When relay 80 is energized, responsive to the light from an approaching vehicle, contacts 82 and 83 are closed.

Contact 82 shunts condenser 77 so that the effective capacity from point 84 to ground includes only condensers 71 and 78 in series. This capacity may be 10 times that of the combination including condenser 77, which increases the efficiency of the voltage doubler circuit, at the frequency of operation, and this increases the gain of the reflex circuit. Consequently, the current through relay coil 81 is increased when the relay closes.

To understand the operation of the control circuit, assume that foot switch 35 has been operated so that arm 36 engages "automatic" contact 37. The slave relay 30 is energized from battery 12 through arm 36, contact 37, and contact 82, assuming that no car is approaching so that sensitive relay 80 is de-energized. Relay armature 31 thus engages contact 34 to energize high beam filaments HF.

When a car approaches, sensitive relay 80 is energized to switch contacts 82 and 83. This drops slave relay 30 so that its armature 31 engages contact 32 to energize low beam filaments LF.

Now assume that switch 35 is operated to engage arm 36 with "manual" contact 38 when a car is approaching so that sensitive relay 80 is energized. Slave relay 30 is energized through arm 36, contact 38 and contact 82 to switch the headlamps to bright. Reflex circuit 20 remains energized from battery 12 through contact 83. When the approaching vehicle passes, relay 80 drops, dropping relay 30 to dim the headlamps. The reflex circuit 20 is de-energized through opening of contact 83, and the headlamps stay dim until switch 35 is again operated.

Assume now that switch 35 is operated to engage arm 36 with "manual" contact 38 when the headlamps are on bright and no vehicle is approaching. Relay 30 is immediately dropped to switch the headlamps to dim. Also, the energizing circuit for reflex circuit 20 is broken at contact 37. The headlamps are locked on dim independently of the sensitive relay 80.

The arrangement thus has the advantages that only a standard foot operated headlamp control switch is required and the lamp switching is the same with or without operation of the automatic control. Also, the headlamps may be locked in the dim position but cannot be locked in the bright position. Most importantly, no re-education of the driver is required.

Fig. 3 illustrates an alternative arrangement of the light control circuit, which has all the foregoing advantages of the arrangement of Fig. 2 with the additional advantage of eliminating one contact means of the sensitive relay 80. In the arrangement of Fig. 3, relay 80 has a single armature 86 engaged with a contact 87, when the relay is open, and with a contact 88 when the relay is closed. Contact 87 is connected to relay coil 33 through diode 90, and contact 88 is arranged to shunt condenser 77. Reflex circuit 20 is energized through condenser 79.

Assume arm 36 of switch 35 is engaged with "automatic" contact 37. Relay 30 is energized through arm 36, contacts 37 and 87, and armature 86, so that the headlamps are on bright. If a car approaches, relay 80 closes to engage armature 86 with contact 88, dropping slave relay 30 to dim the headlamps. Diode 90 presents a high resistance in series with relay coil 33.

If switch 35 is operated to engage arm 36 with "manual" contact 38 with the headlamps on bright, relay 30 is dropped, to dim the headlamps, as condenser 77 prevents D. C. flow to the relay. The reflex circuit 20 is de-energized so the headlamps are locked in the dim position.

If switch arm 36 is engaged with "manual" contact 38 by operating switch 35, with the headlamps dim and a car approaching, relay 30 is energized through arm 36, contacts 38 and 88, and armature 86. Reflex unit 20 is still energized through contact 88 and diode 90. When the approaching car passes, relay 80 drops to drop relay 30. The headlamps are dimmed and stay dim until switch 35 is again operated.

While specific embodiments of the invention have been shown and described in detail to illustrate the application of the invention principles, it will be understood that the invention may be embodied otherwise without departing from such principles.

What is claimed is:

1. In combination with an automotive vehicle having "bright" and "dim" headlamp filaments and a foot-operated headlamp control switch including means operable, on successive actuations of the switch, to alternately connect either of a pair of contacts to a source of electrical energy, a headlamp control system comprising a headlamp control relay including a movable armature connected to the vehicle source of electrical energy and a pair of contacts respectively connected to the "bright" and "dim" filaments, said armature engaging one contact when the relay is energized and the other contact when the relay is de-energized; a photo-transistor arranged to have light from an approaching vehicle directed thereupon to develop an electrical output signal responsive to the light input; a reflex circuit connected to the output of said photo-transistor to amplify such output signal; a sensitive relay having an operating coil connected to the output of said reflex circuit and including means operable by said operating coil, and means, including circuit connections, connecting the contacts of said foot-operated switch and said switch means conjointly in the energizing circuit of said control relay; whereby the headlamps may be controlled manually by said foot-operated switch or automatically by said photo-transistor.

2. In combination with an automotive vehicle having "bright" and "dim" headlamp filaments and a foot-operated headlamp control switch including means operable, on successive actuations of the switch, to alternately connect either of a pair of contacts to a source of electrical energy, a headlamp control system comprising a headlamp control relay including a movable armature connected to the vehicle source of electrical energy and a pair of contacts respectively connected to the "bright" and "dim" filaments, said armature engaging one contact when the relay is energized and the other contact when the relay is de-energized; a photo-transistor arranged to have light from an approaching vehicle directed thereupon to develop an electrical output signal responsive to the light input; a reflex circuit connected to the output of said photo-transistor, and including a transistor-triode to amplify such output signal; a sensitive relay having an operating coil connected to the output of said reflex circuit, and including switch means operable by said operating coil; and means, including circuit connections, connecting the contacts of said foot-operated switch and said switch conjointly in the energizing circuit of said control relay; whereby the headlamps may be controlled manually by said foot-operated switch or automatically by said photo-transistor.

3. In combination with an automotive vehicle having "bright" and "dim" headlamp filaments and a foot-operated headlamp control switch including means operable, on successive actuations of the switch, to alternately connect either of a pair of contacts to a source of electrical energy, a headlamp control system comprising a headlamp control relay including a movable armature connected to the vehicle source of electrical energy and a pair of contacts respectively connected to the "bright" and "dim" filaments, said armature engaging one contact when the relay is energized and the other contact when the relay is de-energized; a photo-transistor arranged to have light from an approaching vehicle directed thereupon to develop an electrical output signal responsive to the light input; a first transistor triode connected to said photo-transistor to amplify such output signal; a reflex circuit connected to the output of said first transistor triode, and including a second transistor-triode to further amplify such output signal; a sensitive relay having an operating coil connected to the output of said reflex circuit, and including switch means operable by said operating coil; and means, including circuit connections, connecting the contacts of said foot-operated switch and said switch means conjointly in the energizing circuit of said control relay; whereby the headlamps may be controlled manually by said foot-operated switch or automatically by said photo-transistor.

4. In combination with an automotive vehicle having "bright" and "dim" headlamp filaments and a foot-operated headlamp control switch including means operable, on successive actuations of the switch, to alternately connect either of a pair of contacts to a source of electrical energy, a headlamp control system comprising a headlamp control relay including a movable armature connected to the vehicle source of electrical energy and a pair of contacts respectively connected to the "bright" and "dim" filaments, said armature engaging one contact when the relay is energized and the other contact when the relay is de-energized; a photo-transistor; means, including a lens and a light chopper, operable to direct light from an approaching vehicle on said photo-transistor to develop an A. C. electrical output signal responsive to the light input; a first transistor triode connected to said photo-transistor to amplify such A. C. output signal; a reflex circuit connected to the output of said first transistor triode, and including a second transistor-triode and transistor diodes to further amplify such A. C. output signal, rectify the same, and amplify the rectified signal; a sensitive relay having an operating coil connected to the output of said reflex circuit; and including switch means operable by said operating coil; and means, including circuit connections, connecting the contacts of said foot-operated switch and said switch means conjointly in the energizing circuit of said control relay; whereby the headlamps may be controlled manually by said foot-operated switch or automatically by said photo-transistor.

5. In combination with an automotive vehicle having "bright" and "dim" headlamp filaments and a foot-operated headlamp control switch including means operable, on successive actuations of the switch, to alternately connect either of a pair of contacts to a source of electrical energy, a headlamp control system comprising a headlamp control relay including a movable armature connected to the vehicle source of electrical energy and a pair of contacts respectively connected to the "bright" and "dim" filaments, said armature engaging one contact when the relay is energized and the other contact when the relay is de-energized; a photo-transistor; means, including a lens and a light chopper, operable to direct light from an approaching vehicle on said photo-transistor to develop an A. C. electrical output signal responsive to the light input; a first transistor triode connected to said photo-transistor to amplify such A. C. output signal a reflex circuit connected to the output of said first transistor triode, and including a second transistor-triode and transistor diodes to further amplify such A. C. output signal, rectify the same, and amplify the rectified signal; a sensitive relay having an operating coil connected to the output of said reflex circuit; and including switch means operable by said operating coil; and means including circuit connections, connecting the contacts of said foot-operated switch and said switch means conjointly in the energizing circuit of said control relay; whereby the headlamps may be controlled manually by said foot-operated switch or automatically by said photo-transistor; said sensitive relay, when energized after said foot-operated switch has been actuated to operate said control relay to energize the "bright" filaments, operating said control relay to connect the "dim" filaments to such source.

6. In combination with an automotive vehicle having "bright" and "dim" headlamp filaments and a foot-operated headlamp control switch including means operable, on successive actuations of the switch, to alternately connect either of a pair of contacts to a source of electrical energy, a headlamp control system comprising a headlamp control relay including a movable armature connected to the vehicle source of electrical energy and a pair of contacts respectively connected to the "bright" and "dim" filaments, said armature engaging one contact when the relay is energized and the other contact when the relay is de-energized; a photo-transistor; means, including a lens and a light chopper, operable to direct light from an approaching vehicle on said photo-transistor to develop an A. C. electrical output signal responsive to the light input; a first transistor triode connected to said photo-transistor to amplify such A. C. output signal; a reflex circuit connected to the output of said first transistor triode, and including a second transistor-triode and transistor diodes to further amplify such A. C. output signal, rectify the same, and amplify the rectified signal; circuit means connecting said foot-operated switch in the energizing circuit of said reflex circuit; a sensitive relay having an operating coil connected to the output of said reflex circuit, and including switch means operable by said operating coil; and means including circuit connections, connecting the contacts of said foot-operated switch and said switch means conjointly in the energizing circuit of said control relay; whereby the headlamps may be controlled manually by said foot-operated switch or automatically by said photo-transistor; said foot-operated switch, when actuated to operate said control relay to energize the "dim" filaments, de-energizing said reflex circuit.

7. In combination with an automotive vehicle having "bright" and "dim" headlamp filaments and a foot-operated headlamp control switch including means operable, on successive actuations of the switch, to alternately connect either of a pair of contacts to a source of electrical energy, a headlamp control system comprising a headlamp control relay including a movable armature connected to the vehicle source of electrical energy and a pair of contacts respectively connected to the "bright" and "dim" filaments, said armature engaging one contact when the relay is energized and the other contact when the relay is de-energized; a photo-transistor; means, including a lens and a light chopper, operable to direct light from an approaching vehicle on said photo-transistor to develop an A. C. electrical output signal responsive to the light input; a first transistor triode connected to said photo-transistor to amplify such A. C. output signal; a reflex circuit connected to the output of said first transistor triode, and including a second transistor-triode and transistor diodes to further amplify such A. C. output signal, rectify the same, and amplify the rectified signal; circuit means connecting said first operated switch in the energizing circuit of said reflex circuit; a sensitive relay having an operating coil connected to the output of said reflex circuit, and including switch means operable by said operating coil; and means, including circuit connections, connecting the contacts of said foot-operated switch and said switch means conjointly in the energizing circuit of said control relay; whereby the headlamps may be controlled manually by said foot-operated switch or automatically by said photo-transistor; said foot-operated switch, when actuated to operate said control relay to energize the "dim" filaments, de-energizing said reflex circuit; and said sensitive relay, when energized after said foot-operated switch has been actuated to operate said control relay to energize the "bright" filaments, operating said control relay to connect the "dim" filaments to such source.

8. A headlamp control system as claimed in claim 7 including a temperature compensating impedance network in operative association with said photo-transistor.

9. A headlamp control system as claimed in claim 7 including temperature compensating impedance network means in operative association with said photo-transistor, and with said first and second transistor triodes.

References Cited in the file of this patent

UNITED STATES PATENTS

| | | |
|---|---|---|
| 1,547,154 | Hull | July 21, 1925 |
| 1,784,150 | Loftin | Dec. 9, 1930 |
| 2,632,040 | Rabinow | Mar. 17, 1953 |
| 2,669,635 | Pfann | Feb. 16, 1954 |